United States Patent [19]

Seitz

[11] Patent Number: 5,204,185

[45] Date of Patent: Apr. 20, 1993

[54] MICROENCAPSULATION PROCESS USING MELAMINE-FORMALDEHYDE AND MICROCAPSULES PRODUCED THEREBY

[75] Inventor: Michael E. Seitz, Miamisburg, Ohio

[73] Assignee: The Standard Register Company, Dayton, Ohio

[21] Appl. No.: 625,435

[22] Filed: Dec. 11, 1990

[51] Int. Cl.⁵ .................... B01J 13/18; B41M 5/165
[52] U.S. Cl. ..................... 428/402.21; 264/4.7; 503/213
[58] Field of Search .................... 264/4.7; 428/402.21

[56] References Cited

U.S. PATENT DOCUMENTS

| | | | |
|---|---|---|---|
| 4,396,670 | 8/1983 | Sinclair | 264/4.7 X |
| 4,406,816 | 9/1983 | Sliwka | 264/4.7 X |
| 4,409,156 | 10/1983 | Hoshi et al. | 264/4.7 X |
| 4,562,116 | 12/1985 | Okada et al. | 264/4.7 X |
| 4,574,110 | 3/1986 | Asano et al. | 264/4.7 X |
| 4,824,823 | 4/1989 | Pietsch et al. | 264/4.7 X |
| 4,965,025 | 10/1990 | Pietsch et al. | 264/4.7 |
| 5,011,634 | 4/1991 | Pietsch et al. | 264/4.7 |

Primary Examiner—Robert L. Stoll
Assistant Examiner—John M. Covert
Attorney, Agent, or Firm—Killworth, Gottman, Hagan & Schaeff

[57] ABSTRACT

A process for producing melamine-formaldehyde microcapsules using a reactive protective colloid is provided. The reactive protective colloid is prepared by reactively coupling a surface active polymer with a first melamine-formaldehyde pre-condensate. An aqueous solution which includes the reactive protective colloid and a second melamine-formaldehyde pre-condensate is then prepared. A substance to be encapsulated, preferably an oily solution containing a dyestuff precursor, is dispersed as droplets into the aqueous solution. The reactive protective colloid surrounds the droplets to form an emulsion. The second melamine-formaldehyde pre-condensate and the reactive protective colloid are made to self-condense to form melamine-formaldehyde microcapsule walls around the droplets of the substance to be encapsulated.

14 Claims, No Drawings

MICROENCAPSULATION PROCESS USING MELAMINE-FORMALDEHYDE AND MICROCAPSULES PRODUCED THEREBY

BACKGROUND OF THE INVENTION

The present invention relates to a process for producing melamine-formaldehyde microcapsules and to the microcapsules produced thereby. More particularly, the present invention relates to an improved process for producing melamine-formaldehyde microcapsules using a protective colloid which has been coupled with a melamine-formaldehyde pre-condensate.

In the manufacture of pressure-sensitive recording papers, better known as carbonless copy papers, a layer of pressure-rupturable microcapsules containing a solution of colorless dyestuff precursor is normally coated on the back side of the front sheet of paper of a carbonless copy paper set. This coated back side is known as the CB coating. In order to develop an image or copy, the CB coating must be mated with a paper containing a coating of a suitable color developer, also known as dyestuff acceptor, on its front. This coated front side is called the CF coating. The color developer is a material, usually acidic, capable of forming the color of the dyestuff by reaction with the dyestuff precursor.

Marking of the pressure-sensitive recording papers is effected by rupturing the capsules in the CB coating by means of pressure to cause the dyestuff precursor solution to be exuded onto the front of the mated sheet below it. The colorless or slightly colored dyestuff precursor then reacts with the color developer in the areas at which pressure was applied, thereby effecting the colored marking. Such mechanism for the technique of producing pressure-sensitive recording paper is well know.

Also well known are self-contained sheets which have the CB coating and the CF coating layered or admixed on a support sheet. Such sheets are also considered carbonless copy papers.

Microencapsulation has been used in the production of carbonless copy papers for some time. It is well know to use melamine-formaldehyde (sometimes hereinafter referred to as "MF") in the microencapsulation process as the material out of which the microcapsule wall is constructed. Typically, a water soluble MF pre-condensate is dissolved in an aqueous solution (known as the external phase). A discontinuous phase of a material to be encapsulated (known as the internal phase or core material) is emulsified in the external phase using a water soluble, surface active polymer as a protective colloid. Generally, the internal phase will consist of droplets of an oily solution. In the production of carbonless copy paper, the internal phase wall contain therein a dissolved dyestuff precursor solution.

A condensation reaction of the MF pre-condensate is next initiated by lowering the pH of the emulsion. As the molecular weight of the MF pre-condensate increases, it precipitates (or more precisely liquid-liquid phase separates) onto the oil droplets whereon further condensation and cross-linking of the MF and MF pre-condensate completes the formation of the capsule wall.

Variations of this general reaction scheme can be found in the prior art. For example, Kureha, U.S. Pat. Nos. 4,460,722 and 4,562,116 disclose a complex coacervation reaction in which a cationic urea resin and a MF pre-condensate simultaneously condense in the presence of an anionic surfactant.

Regardless of the method of MF microencapsulation chosen, the most critical step is that of getting the phase-separated MF polymer to collect uniformly on and around the internal phase droplets without destabilizing the emulsion. The success or failure of this step is dependent upon the choice of protective colloid used to establish the initial emulsion.

There is an inherent contradiction in the role of the protective colloid. On one hand, the protective colloid stabilizes the emulsion by orienting itself at the internal phase/external phase interface, thus establishing a steric and/or charged boundary layer around each droplet. This layer serves as a barrier to other particles or droplets preventing their intimate contact and coalescence and thereby maintains uniform droplet size. On the other hand, the protective colloid must aid, or at least allow, phase-separated MF polymer particles to pass freely to and collect at the internal phase/external phase interface. Failure to find an adequate solution to this contradiction in demands on the protective colloid results in thickening or gelling of the microcapsule slurry, formation of aggregates of microcapsules instead of single microcapsule droplets, and non-uniform microcapsule sizes.

One solution disclosed in the prior art exploits the weakly cationic (partially positive charge) nature of the MF condensate at low ph. Anionic (negatively charged) protective colloids are used to stabilize the emulsion. For example, Sliwka, U.S. Pat. No. 4,406,816, discloses the use of a water soluble homopolymer or copolymer having sulfonic acid groups attached thereto as an anionic protective colloid. Similarly, Mitsui, U.S. Pat. No. 4,574,110, teaches the use of an acrylic copolymer as an anionic protective colloid. The negatively charged protective colloid layer about the droplet is no barrier to the oppositely charged MF condensate particles. As the MF continues to polymerize and grow, it physically displaces the protective colloid from the internal phase/external phase interface and begins to form the microcapsule wall.

However, the MF pre-condensate is also positively charged at low pH and is therefore similarly attracted to and associates with the negatively charged protective colloid. This association destabilizes the emulsion by reducing the charged layer about the droplets when the pH is lowered to begin the self-condensation reaction of the MF pre-condensate. The destabilized emulsion allows internal phase droplets to combine with other internal phase droplets to form larger droplets. These large droplets in turn become large, non-uniformly sized microcapsules.

Another problem that occurs as a result of the association between the MF pre-condensate and protective colloid is the formation of aggregates of microcapsules due to the fact that the protective colloid is unable to separate the microcapsules as the phase-separated MF is polymerizing and cross-linking around the internal phase droplets. When these semi-liquid microcapsules come into contact with each other, polymerizing MF in the microcapsule walls cross-links with polymerizing MF in other microcapsule walls and thereby forms large conglomerates of microcapsules.

To overcome these problems, steps must be implemented to minimize the destabilization induced by the association between the MF pre-condensate and the anionic protective colloid. Hoshi et. al., U.S. Pat. No.

4,409,156, for example, discloses the use of a polyvalent isocyanate to stabilize the emulsion. However, such prior art methods are difficult to carry out and therefore must be meticulously monitored and manipulated by highly skilled operators. To maintain uniform droplet size, high speed mixing is required. However, the high speed mixing must be stopped precisely when wall formation begins or the freshly condensed MF polymer will be sheared from the internal phase droplet without forming a wall thereon.

In addition, the reaction rate must be strictly controlled through pH and temperature changes to maintain sufficient time intervals between the emulsification and capsule wall formation steps to allow the protective colloid to dissociate from the polymerizing MF pre-condensate to re-establish a steric boundary around the internal phase droplets. The strict monitoring and precise reaction condition manipulations restrict the prior art encapsulation processes to a batch operation. Even so, the successful production of uniformly sized MF microcapsules is difficult to obtain.

Accordingly, the need exists in the art for an improved MF microencapsulation process which is easier to carry out and results in the production of more uniformly sized microcapsules.

SUMMARY OF THE INVENTION

That need is met by the present invention which provides a process for producing MF microcapsules using as the protective colloid a surface active polymer which has been modified by coupling to a MF pre-condensate. The resulting protective colloid is both strongly surface active and co-reactive with phase separated MF condensate. Thus, the reactive protective colloid of the present invention stabilizes the internal phase/external phase emulsion by orienting itself at the interface thereof, but at the same time provides for a uniform build-up of phase separated MF condensate at the interface by co-condensing and cross-linking with the phase separated MF condensate.

The bi-functional nature of the reactive protective colloid of the present invention is made possible because of the coupling of two different molecules which have different physical properties. The surface active polymer portion is an emulsifier for oil in water and thus orients the reactive protective colloid at the internal phase/external phase interface, thereby causing each internal phase droplet to be completely surrounded and stabilized by the reactive protective colloid.

The MF pre-condensate portion of the protective colloid is co-reactive with the MF condensate so that when the free MF pre-condensate is made to self-condense and thereby phase separate, the condensed, phase separated MF co-condenses and cross-links with the MF pre-condensate portion of the reactive protective colloid to polymerize around the internal phase droplet. The capsule wall continues to build in this manner without destabilizing the emulsion since the protective colloid need not be displaced from the internal phase/external phase interface, as it is in the prior art methods. Rather it remains around the internal phase droplets to become part of the microcapsule wall.

In accordance with one aspect of the present invention, a process for producing melamine-formaldehyde microcapsules is provided which includes the steps of preparing a reactive protective colloid by reactively coupling a surface active polymer with a first melamine-formaldehyde pre-condensate, preparing an aqueous solution (the external phase) comprising the reactive protective colloid and a second melamine-formaldehyde pre-condensate, and dispersing a discontinuous phase of a substance to be encapsulated (the internal phase) as droplets into the aqueous solution. The reactive protective colloid surrounds the droplets of the substance to be encapsulated to form an emulsion. The self-condensation reaction of the second melamine-formaldehyde pre-condensate and the reactive protective colloid is initiated, preferably by decreasing the pH thereof. The second melamine-formaldehyde pre-condensate thereby co-condenses with the reactive protective colloid to form capsule walls around the droplets of the substance to be encapsulated.

In a preferred embodiment, the step of preparing the reactive protective colloid and the step of preparing the aqueous solution may be effected simultaneously. In this instance, the first melamine-formaldehyde pre-condensate is preferably of the same as the second melamine-formaldehyde pre-condensate.

Alternatively, the first melamine-formaldehyde pre-condensate may be different than the second melamine-formaldehyde pre-condensate. In this case, the second melamine-formaldehyde pre-condensate may be added during the step of preparing the aqueous solution.

Preferably, the step of preparing the reactive protective colloid is effected under alkaline conditions. The preferred pH range for this step is from about 7.0 to 9.0. Even more preferably, the pH range is from about 8.5 to 9.0.

The step of causing the second melamine-formaldehyde pre-condensate and the reactive protective colloid to self-condense is preferably effected by decreasing the pH of the emulsion to below about 5.0 and adding heat thereto. The pH can be lowered by adding an acid to the emulsion.

The formaldehyde to melamine mole ratio of the melamine-formaldehyde pre-condensate is preferably from about 3:1 to 6:1.

The surface active polymer used to prepare the reactive protective colloid preferably contains pendent amine and/or amide groups. More preferably, the surface active polymer is selected from the group consisting of casein, casein salts such as sodium caseinate, and partially hydrolyzed casein.

In addition to the reactive protective colloid, a non-reactive protective colloid which is less surface active than the reactive protective colloid can be added to the aqueous solution (external phase) during the preparation thereof.

In a preferred embodiment of the invention, the melamine-formaldehyde microcapsules contain an oily solution having a dyestuff precursor dissolved therein. In another preferred embodiment of the present invention, these microcapsules can be coated on a support sheet to produce carbonless copy paper.

The process of the present invention results in the formation of microcapsules comprising an encapsulated substance surrounded by capsule walls formed by the co-condensation of (1) a reactive protective colloid comprising a surface active polymer coupled to a first melamine-formaldehyde pre-condensate and (2) a second melamine formaldehyde precondensate. The preferred surface active polymer contains pendant amine and/or amide groups. Most preferably, the surface active polymer is selected from the group consisting of casein, casein salts, and partially hydrolyzed casein.

Where the microcapsules are designed for use on carbonless copy paper, the substance encapsulated is an oily solution having a dyestuff precursor dissolved therein. The microcapsules may be coated in a conventional manner onto a support sheet to form a carbonless copy paper sheet.

Accordingly, it is an object of the present invention to provide an improved process for the production of melamine-formaldehyde microcapsules which are of uniform size, have capsule walls of even thickness, and which are not aggregated.

Another object of the present invention is to provide improved melamine-formaldehyde microcapsules. Another object of the present invention is to provide improved melamine-formaldehyde microcapsules which can be used in the preparation of carbonless copy paper. Still another object of the present invention is to provide carbonless copy paper having improved melamine-formaldehyde microcapsules coated thereon. These and other objects, features and attendant advantages of the present invention will become apparent to those skilled in the art from a reading of the following detailed description of the preferred embodiment and the appended claims.

DETAILED DESCRIPTION OF THE PREFERRED EMBODIMENT

In a preferred embodiment of the present invention, melamine-formaldehyde microcapsules are produced using a reactive protective colloid. The reactive protective colloid is produced by coupling a surface active polymer with a melamine-formaldehyde pre-condensate. The colloid stabilizes the internal phase/external phase emulsion and at the same time provides a reaction center for the condensation and cross-linking of the melamine-formaldehyde condensate by co-condensing and cross linking with the wall-forming melamine-formaldehyde. Uniform wall build up is thereby achieved without losing emulsion stability.

One preferred method of producing the melamine-formaldehyde microcapsules of the present invention begins with the preparation of a reactive protective colloid. The reactive protective colloid is formed by reactively coupling a surface active polymer with a first melamine-formaldehyde pre-condensate. The coupling reaction preferably takes place under alkaline conditions so that the MF pre-condensate does not self-condense during the reaction. A pH of 7.0 to 9.0 is preferred, with a pH of 8.5 to 9.0 being the most preferred.

The surface active polymer used is highly surface active. That is to say, the surface active polymer is an emulsifier for the internal phase in the external phase. When used in the process of the present invention, the surface active polymer should have sufficient surface activity to ensure that it occupies the internal phase/external phase interface preferentially to all other materials present. In addition, the surface active polymer should preferably contain pendant amine and/or amide groups. Suitable surface active polymers include casein, casein salts such as sodium caseinate, and partially hydrolyzed casein. The surface activities of these polymers are sufficient to insure that they occupy the internal phase/external phase interface preferentially to all other materials present.

The surface activity is measured by the effectiveness of the polymer in producing an oil in water (o/w) emulsion [40 parts oil in 60 parts water] under fixed conditions. A polymer, added to water at 1.5%, that produces an o/w emulsion having water droplets no larger than 6 microns when subjected to high shear (as in a Waring blender) for 45 seconds is considered to be surface active for purposes of the present invention. The smaller the oil droplet, the more surface active the polymer.

The MF pre-condensate used in the process of the present invention should be water soluble. Accordingly, the MF pre-condensate should have a relatively low molecular weight and a relatively high formaldehyde to melamine mole ratio (as compared to other MF pre-condensates). Preferably, the formaldehyde to melamine mole ratio is from about 3:1 to 6:1. Examples of suitable MF pre-condensates include hexamethylol melamine and pentamethylol melamine.

When the coupling reaction between the MF pre-condensate and the surface active polymer is performed, the MF pre-condensate reacts with the pendent amine and/or amide groups on the polymer such the MF pre-condensate is joined to the polymer by methylene bridges. As an example shown below, hexamethylol melamine reacts with a polymer containing a pendant amine group.

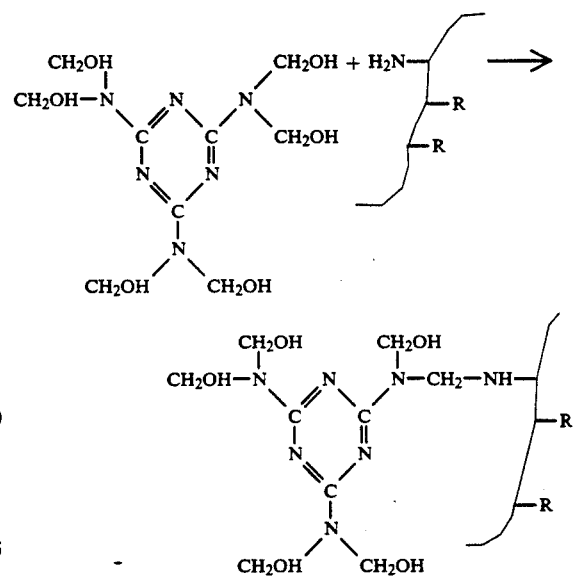

The resulting reactive protective colloid contains two distinct portions. The first portion is a surface active polymer having an affinity for the internal phase/external phase interface so that the colloid orients itself around droplets of the internal phase. This orientation in turn results in a stable emulsion of internal phase droplets in the external phase. The second portion of the reactive protective colloid is a MF pre-condensate which will co-condense and cross link with wall-forming MF condensate after the pH has been lowered. Moreover, the MF pre-condensate portion is oriented around but directed away from the internal phase droplet by virtue of being coupled to the surface active polymer. This second portion of the reactive protective colloid thus forms a reaction site for the formation of the capsule wall by joining with the wall-forming MF condensate in forming the capsule wall.

The net result is that the reactive protective colloid of the present invention does not have to be displaced from the internal phase/external phase interface in order for the wall-forming MF condensate to collect at that interface. Instead, the reactive protective colloid remains oriented around the internal phase droplets while wall formation begins to become part of the capsule wall itself. Thus, a capsule wall is formed around each internal phase droplet without destabilizing the internal phase/external phase emulsion.

The next step in producing MF microcapsules in accordance with the present invention is to prepare an aqueous solution which will serve as the external phase. This aqueous solution comprises the reactive protective colloid produced in the preceding step and a second MF pre-condensate.

In one embodiment of the invention, the same MF pre-condensate is used to produce the reactive protective colloid as well as to form the capsule wall. In accordance with this embodiment, the steps of preparing the reactive protective colloid and preparing the aqueous solution are combined. Thus, an excess of MF pre-condensate over that which is needed to produce the reactive protective colloid is reacted with a surface active polymer in an aqueous solution. The excess MF pre-condensate represents that amount which will subsequently self-condense and phase separate to collect at and surround the internal phase droplets, whereupon it will co-condense and cross link with the reactive protective colloid emulsifying the internal phase droplets to form a capsule wall around each droplet. The resulting aqueous solution will include a reactive protective colloid and a MF pre-condensate and will serve as the external phase. Since an excess of MF pre-condensate is used, this embodiment has the advantages of a faster coupling reaction between the surface active polymer and the MF pre-condensate and the decreased likelihood that multiple surface active polymers will react with single MF pre-condensates.

In another embodiment of the present invention, different MF pre-condensates are used to form the reactive protective colloid and the preparing the capsule wall. In this instance, the steps of preparing the reactive protective colloid and preparing the aqueous solution are carried out separately. After the reactive protective colloid using a first MF pre-condensate is prepared in an aqueous solution, a second MF pre-condensate, which will phase separate from the external phase to form the capsule wall, is added to that aqueous solution to form the external phase.

In addition to the reactive protective colloid, a non-reactive protective colloid can be added to the aqueous solution during the preparation thereof. The non-reactive protective colloid serves as a binder and improves the long term stability of the microcapsule capsule dispersion. However, if such a non-reactive protective colloid is added before the emulsification step, this colloid must be less surface active than the reactive protective colloid so that the reactive protective colloid alone occupies the internal phase/external phase interface around each internal phase droplet.

Regardless of which embodiment is chosen, the next step in the preparation of MF microcapsules in accordance with the process of the present invention is dispersing a discontinuous phase of a substance to be encapsulated (the internal phase) as droplets into the aqueous solution. The dispersion of droplets can be achieved through the use of a high speed mixer or by any other means known in the art. Immediately upon droplet formation, the reactive protective colloid surrounds each droplet thus formed. Unlike prior art methods (where high speed mixing must be continued right up until the time that wall formation begins and then precisely halted), mixing is terminated prior to initiation of the MF self-condensation reaction.

The final step includes the self-condensation reaction of the second (wall forming) melamine-formaldehyde pre-condensate and of the reactive protective colloid. This step is effected by decreasing the pH of the emulsion to below about 5.0 and adding heat thereto. pH reduction can be accomplished by adding an acid to the emulsion. Upon pH reduction, the second, wall forming MF pre-condensate begins to self-condense, eventually becomes insoluble in the aqueous solution, and phase separates therefrom. Contemporaneous with the self-condensation of the wall forming MF pre-condensate is the self-condensation of the MF pre-condensate portion of the reactive protective colloid. Upon phase separation, the wall forming MF condensate comes into contact with the self-condensing reactive protective colloid and begins to cross link therewith as the two molecules continue to condense. Since the reactive protective colloid is oriented around each internal phase droplet, this condensation and cross linking results in the formation of a fully polymerized, hardened microcapsule wall around each such droplet upon completion of the condensation reaction.

In a preferred embodiment, the encapsulated substance in the MF microcapsules of the present invention is an oily solution having a dyestuff precursor dissolved therein as is conventional in the art. Such reactive, typically colorless, chromogenic dyestuff precursors include crystal violet lactone, the p-toluenesulfonate salt of Michler's hydrol or 4,4'-bis (dimethylamino) benzhydrol, benzoyl leuco methylene blue, indolyl red, malachite green lactone, and rhodamine lactone. In this manner, the MF microcapsules can be coated on a support sheet to produce carbonless copy paper.

The resulting MF microcapsules are of uniform size, have excellent capsule wall integrity, and are evenly dispersed as a slurry without aggregation. Moreover, the presently claimed process is, when compared to existing methods, simple in its operation and has a high rate of success.

In order that the invention may be more readily understood, reference is made to the following example, which is intended to be illustrative of the invention, but is not intended to be limiting in scope.

EXAMPLE 1

A. Preparation of the Internal Phase

In a 2L beaker containing 833.4g of diisopropyl naphthalene, 36 g of dimethyl azelate, and 36g of Factoil ® 39 (a paraffinic oil from Sohio), the following Pergascript color former dyestuff precursors (from Ciba-Geigy) were added: 52.7g I-2GN Green, 28.2g I-6B Red, 10.8g I-2R Blue, and 62.8g I-BR Black. The stirred slurry was heated to 118° C. to dissolve the dyestuffs. Then 261.2g of Norpar ® 13 Special (a C13 paraffinic solvent from Exxon) was added, and the solution was cooled to 25° C.

B. Preparation of the External Phase

In a 4L beaker containing 1345g of water, the following were added: 3.92g of polyvinylpyrrolidone (PVP) with a molecular weight of 360,000, 21.14g of PVP with a molecular weight of 40,000, and 25.06g of casein.

The mixture was stirred and heated to 80° C. Then, 8.2g of borax and 270.0g of Basocoll ® SD (a partially methylated precondensate of 1 mole of melamine and 5.25 moles of formaldehyde (with about 2.3 CH$_3$O groups per condensate) from BASF) were added. The pH was 8.7. The temperature was maintained at 80° C. for 1 hour, then cooled to 25° C. After the water lost through evaporation was replaced, 488g of water was added. The pH was then equal to 8.4.

C. Encapsulation

The external phase was added to a 1 gallon Waring Blender connected to a Variac. With the Waring set on low speed and the Variac at 60%, the internal phase was added within a 30-second period, then mixed for 40 more seconds with the Variac set at 80%. The emulsion was transferred back to the 4L beaker, and 140g of a 5.71% aqueous solution of citric acid was added dropwise to lower the pH to 4.4. The emulsion was heated to 60° C. and held for 4 hours. After the 4 hour cure, 18g borax and 50 ml water were added, then cooled to 25° C. While cooling, solids were reduced to about 40% by adding 300 ml more water. A Meyer rod draw down of the capsule slurry on a CF sheet (paper coated with novalac phenolic resin color developer) produced no discoloration indicating excellent capsule integrity. The average capsule size was 4 microns, and only 0.4g of residue was obtained when the slurry was poured through a 150u filter bag.

It will be obvious to those skilled in the art that various changes may be made without departing from the scope of the invention and the invention is not to be considered limited to what is described in the specification.

What is claimed is:

1. A process for producing melamine-formaldehyde microcapsules, comprising the steps of:
    (a) preparing a reactive protective colloid by reactively coupling a surface active polymer selected from the group consisting of casein, casein salts, and partially hydrolyzed casein with a first melamine-formaldehyde pre-condensate;
    (b) preparing an aqueous solution comprising said reactive protective colloid and a second melamine-formaldehyde pre-condensate;
    (c) dispersing a discontinuous phase of substance to be encapsulated as droplets into said aqueous solution, said reactive protective colloid surrounding said droplets of said substance to be encapsulated to form an emulsion and;
    (d) causing said second melamine-formaldehyde pre-condensate and said reactive protective colloid to self-condense, said second melamine-formaldehyde pre-condensate co-condense, with said reactive protective colloid to form capsule walls around said droplets of said substance to be encapsulated thereby forming melamine-formaldehyde microcapsules.

2. The process of claim 1 wherein the step of preparing said reactive protective colloid and the step of preparing said aqueous solution are effected simultaneously.

3. The process of claim 2 wherein said first melamine-formaldehyde pre-condensate and said second melamine-formaldehyde pre-condensate are the same.

4. The process of claim 1 wherein said first melamine-formaldehyde pre-condensate is different from said second melamine-formaldehyde pre-condensate.

5. The process of claim 1 wherein the step of preparing said reactive protective colloid is effected under alkaline conditions.

6. The process of claim 5 wherein the step of preparing said reactive protective colloid is effected at a pH of from about 7.0 to 9.0.

7. The process of claim 1 wherein the step of causing said second melamine-formaldehyde pre-condensate and said reactive protective colloid to self-condense is effected by decreasing the pH of said emulsion and adding heat thereto.

8. The process of claim 7 wherein the pH of said emulsion is decreased to below about 5.0 the temperature of said emulsion is increased to above about 60° C.

9. The process of claim 1 wherein the formaldehyde to melamine mole ratio of said first melamine-formaldehyde pre-condensate is from about 3:1 to 6:1.

10. The process of claim 1 wherein a non-reactive protective colloid which is less surface active than said reactive protective colloid is added to said aqueous solution during the preparation thereof.

11. The process of claim 1 wherein said substance to be encapsulated comprises an oily solution having a dyestuff precursor dissolved therein.

12. The product produced by the process of claim 1.

13. A Melamine-formaldehyde microcapsule comprising:
    (a) an encapsulated substance; and
    (b) a microcapsule wall formed by the co-condensation of (1) a reactive protective colloid, said reactive protective group consisting of casein, casein salts, and partially hydrolyzed casein coupled to a first melamine-formaldehyde pre-condensate, and (2) a second melamine-formaldehyde pre-condensate.

14. The melamine-formaldehyde microcapsule of claim 13 wherein said encapsulated substance comprises an oily solution having a dyestuff precursor dissolved therein.

* * * * *

UNITED STATES PATENT AND TRADEMARK OFFICE
CERTIFICATE OF CORRECTION

PATENT NO. : 5,204,185
DATED : April 20, 1993
INVENTOR(S) : Michael E. Seitz

It is certified that error appears in the above-identified patent and that said Letters Patent is hereby corrected as shown below:

Col. 10, line 44, "reactive protective group" should be --reactive protective colloid comprising a surface active polymer selected from the group--.

Signed and Sealed this

Fourth Day of January, 1994

Attest:

BRUCE LEHMAN

Attesting Officer

Commissioner of Patents and Trademarks